__United States Patent Office__

3,840,595
Patented Oct. 8, 1974

3,840,595
PROCESS FOR THE CONVERSION OF UNSATURATED ALDEHYDES TO ACIDS
Robert K. Grasselli, Chagrin Falls, and Dev D. Suresh, Warrensville Heights, Ohio, assignors to The Standard Oil Company, Cleveland, Ohio
No Drawing. Filed Feb. 22, 1972, Ser. No. 228,375
Int. Cl. C07c 51/26, 57/04
U.S. Cl. 260—530 N            6 Claims

ABSTRACT OF THE DISCLOSURE

Catalysts containing the oxides of tin, tungsten, vanadium, molybdenum and optionally antimony and other multivalent metals are especially desirable in the conversion of unsaturated aliphatic aldehydes to the corresponding unsaturated acids.

BACKGROUND OF THE INVENTION

U.S. 3,567,773 discloses very desirable catalysts of vanadium, tungsten and molybdenum that are useful for the conversion of unsaturated aliphatic aldehydes to acids.

With the increasing desirability of the propylene oxidation route to obtain unsaturated acids, noted in *Chemical Week*, Feb. 9, 1972, at page 41, great emphasis has been placed on attempting to find efficient catalysts for these oxidation reactions. The present invention is a result of this search in the second stage of the process where unsaturated aliphatic aldehydes are converted to the corresponding unsaturated aliphatic acids.

SUMMARY OF THE INVENTION

It has now been discovered according to the present invention that the known process for converting unsaturated aliphatic aldehydes to the corresponding unsaturated aliphatic acids is significantly enhanced by using a catalyst containing $$Sb_aSn_bW_cV_dMo_eO_x$$

wherein $a$ is a number of 0 to about 6
$b$ is a number of about 0.1 to about 12
$c$ is a number of about 0.1 to about 6
$d$ is a number of about 0.5 to about 12
$e$ is a number of about 8 to about 16
$x$ is a number which satisfies the valence requirements of the other elements Using the catalyst of the present invention, higher yields and greater catalyst stability are obtained when compared to the art catalysts.

The important aspect in the present invention is the catalyst employed. As noted, the catalyst may be any of those catalysts delineated by the formula above. Preferred catalysts are those wherein $e$ in the formula is 12, i.e. where $Mo_{12}$ is used in the formula. Also preferred in the present invention, because of the demonstrated high per pass conversions, are the catalysts wherein $a$ is a number of about 0.1 to about 6.

The catalyst is normally employed in the supported form although the unsupported form also has desirable activity. Suitable support materials include silica, titania, zirconia, alumina, boron phosphate, aluminum phosphate, antimony phosphate, pumice and the like. The use of silica as a support is preferred.

In addition to the catalyst components above, the catalysts of the invention may contain additional ingredients which do not deleteriously affect the desirability of the catalyst for the production of unsaturated acids. Thus, for example, other multivalent metals such as Fe, Ni, Co, Zn, Mn, Mg or Cu or mixture thereof, could be used along with basic catalyst components of the invention.

The catalysts of the invention are conveniently prepared in a manner shown by U.S. 3,567,773 and the methods exemplified in the Specific Embodiments.

The process of the present invention is conducted in a known manner which is essentially the same as that shown in U.S. 3,567,773. Broadly, the reaction is conducted in the vapor phase. The catalyst may be placed in a fixed-bed or fluid-bed reactor. The reactants are passed over the catalyst bed in a mole ratio of about 0.5 to about 4 moles of oxygen per mole of aldehyde and about 1 to about 20 moles of water per mole of aldehyde.

The temperature of the reaction is usually maintained between about 200° and about 450° C., with temperatures in the range of about 250° to about 400° C. being preferred. The pressure may vary widely and may range from about 0.5 to about 10 atmospheres.

The preferred reaction in the present invention is the conversion of acrolein to acrylic acid. Of course, other unsaturated aliphatic aldehydes can be converted to the corresponding unsaturated aliphatic acids using the catalysts and techniques of the present invention.

SPECIFIC EMBODIMENTS

Example 1.—Preparation of a catalyst containing SbSnVWMo

A catalyst having the composition 62%

$$Sb_3Sn_3V_3W_{1.2}Mo_{12}O_x$$

and 38% $SiO_2$ was prepared by digesting 21.9 g. of $Sb_2O_3$ in 50 cc. of concentrated $HNO_3$ and adding 22.5 g. $SnO_2$. The supernatant liquid was decanted and the solid was washed with water. In warm water 106 g. of $(NH_4)_6Mo_7O_{24}\cdot 4H_2O$ was dissolved, and this solution was added to a slurry of the tin, antimony, 350 g. of 30% weight percent silica sol and 17.6 g. of $NH_4VO_3$ in 600 cc. of water and 16.2 g. of $(NH_4)_6W_7O_{24}\cdot 6H_2O$ suspended in hot water. The pH of the mixture was adjusted to 3 with nitric acid. The mixture was slowly evaporated with stirring and dried in an oven at 130° C. for 24 hours.

Example 2.—Preparation of a catalyst containing SnVWMo

In the same manner as described in Example 1, a catalyst of the composition of 62% $Sn_6V_3W_{1.2}Mo_{12}O_x$ and 38% $SiO_2$ was prepared using 45.0 g. of $SnO_2$ digested with 100 cc. of concentrated nitric acid rather than an oxide mixture of Sn and Sb digested in nitric acid.

Comparative Example A.—Preparation and use of a catalyst of VWMo

In a manner shown by U.S. 3,567,773, Example 1, and consistent with the preparations above, catalyst containing 62% $V_3W_{1.2}Mo_{12}O_x$ and 38% $SiO_2$ was prepared, except that the catalyst was dried at 130° C. for 24 hours and calcined in the reactor.

A portion of the catalyst of 20–35 mesh was placed in a 4 cc. fixed-bed reactor. The reactor was brought to a temperature of 300° C. under a flow of air and maintained at 300° C. for 2 hours. A feed of 1 acrolein/6 air/5 $H_2O$ was fed through the bed at a rate which gave a contact time of one second. The reactor was run with the feed under the reaction conditions for 15 minutes to precondition the catalyst. After this pre-run, the reactor effluent was collected for 15 minutes. This product was analyzed by gas chromatography. The results of this experiment using the definitions of U.S. 3,567,773 are shown in Table I.

Examples 3 and 4.—Preparation of acrylic acid

The catalysts prepared in Examples 1 and 2 were employed in the manner shown in Comparative Example A. The results of these experiments as compared to the results in Comparative Example A are shown in Table I.

TABLE I

[Comparison of the catalysts of the invention with the catalyst of the art]

| Example | Catalyst | Reaction temp., °C. | Conversion | Selectivity | Single pass yield |
|---|---|---|---|---|---|
| Comp. A | $V_3W_{1.2}Mo_{12}O_x$ | 300 | 85.4 | 72 | 61.1 |
| 3 | $Sb_3Sn_3V_3W_{1.2}Mo_{12}O_x$ | 330 | 91.6 | 78 | 71.2 |
| 4 | $Sn_6V_3W_{1.2}Mo_{12}O_x$ | 300 | 96.5 | 81 | 78.0 |

It is seen from the examples above that the single pass yield is significantly improved using the catalysts of the invention. In addition, it was observed that the stability of the catalyst is also improved.

Example 5.—Preparation of acrylic acid using SbSnVWMo

The reaction shown in Example 3 was run for a period of two hours. After this time, the reactor effluent was collected for 15 minutes. The results of this product sample showed a single pass yield of 84.0%, a conversion of 97.8% and a selectivity of 86%.

In the same manner as described by the examples above, methacrolein is reacted to give methacrylic acid using the catalysts of the present invention.

Also in the same manner as shown by the examples above, catalysts containing $Fe_{0.5}Sn_6W_3V_{1.2}Mo_{12}O_x$, $Co_{0.7}Sb_2Sn_4W_2V_3Mo_{12}O_x$, $CuSb_4SnW_5V_3Mo_{16}O_x$ and $Zn_{0.2}Sn_4WVMo_{10}O_x$ are used in the preparation of unsaturated aliphatic carboxylic acids from the corresponding aldehydes.

We claim:

1. In the process for the production of unsaturated aliphatic acids by the vapor phase catalytic oxidation of the corresponding unsaturated aliphatic aldehydes with molecular oxygen in the presence of steam in a ratio of from about 0.5 to about 4 moles of oxygen and from about 1 to about 20 moles of steam per mole of aldehyde at a temperature of about 200° to about 450° C. and a pressure of about 0.5 to about 10 atmospheres, the improvement comprising using as the catalyst a composition having the empirical formula $$Sn_bW_cV_dMo_eO_x$$

wherein $b$ is a number of about 0.1 to about 12;
$c$ is a number of about 0.1 to about 6;
$d$ is a number of about 0.5 to about 12;
$e$ is a number of about 8 to about 16;
$x$ is a number which satisfies the valence requirements of the other elements said catalyst optionally containing one or more of the elements selected from the group consisting of Fe, Ni, Co, Zn, Mn, Mg and Cu.

2. The process of claim 1 wherein $e$ is 12.
3. The process of claim 1 wherein the catalyst is placed on a silica support.
4. The process of claim 1 wherein acrylic acid is prepared from acrolein.
5. The process of claim 1 wherein methacrylic acid is prepared from methacrolein.
6. The process of claim 1 wherein the catalyst contains Fe, Ni, Co, Zn, Mn, Mg or Cu or a mixture thereof.

References Cited

UNITED STATES PATENTS

| 3,530,175 | 9/1970 | Yanagita et al. | 260—530 N |
| 3,567,772 | 3/1971 | Yanagita et al. | 260—530 N |
| 3,642,930 | 2/1972 | Grasselli et al. | 260—533 N |

FOREIGN PATENTS

| 773,851 | 1/1971 | Belgian | 260—570 N |
| 2,009,172 | 9/1971 | West Germany | 260—530 N |

LORRAINE A. WEINBERGER, Primary Examiner

R. D. KELLY, Assistant Examiner

U.S. Cl. X.R.

252—456, 469